Sept. 26, 1961

T. H. WIANCKO ET AL 3,002,159

OSCILLATOR

Filed Dec. 30, 1957

INVENTORS.
THOMAS H. WIANCKO,
KEITH L. WINSOR,

By

ATTORNEY.

INVENTORS.
Thomas H. Wiancko,
Keith L. Winsor,
By
ATTORNEY.

Sept. 26, 1961  T. H. WIANCKO ET AL  3,002,159
OSCILLATOR
Filed Dec. 30, 1957  3 Sheets-Sheet 3

INVENTORS.
Thomas H. Wiancko,
Keith L. Winsor,
By
ATTORNEY.

United States Patent Office 3,002,159
Patented Sept. 26, 1961

3,002,159
OSCILLATOR
Thomas H. Wiancko, Altadena, and Keith L. Winsor, Pasadena, Calif., assignors, by mesne assignments, to Daystrom Incorporated, Murray Hill, N.J., a corporation of New Jersey
Filed Dec. 30, 1957, Ser. No. 705,891
8 Claims. (Cl. 332—22)

This invention relates to improvements in frequency-modulated oscillators, and more particularly to improvements in frequency-modulated oscillators of the type in which a carrier wave is frequency modulated in accordance with a signal voltage supplied by a signal source.

In a frequency-modulated oscillator embodying this invention, a main amplifier channel is employed together with two feedback circuits. The signal fed back in one circuit is an amplitude-modulated signal in which the output from the amplifier channel is amplitude modulated in accordance with the amplitude of a signal voltage supplied by a signal source. This feedback circuit is sometimes referred to hereinafter as the modulating or auxiliary feedback circuit. The signal fed back in the other feedback circuit is of substantially constant amplitude that is normally independent of the amplitude of the signal source voltage. This other feedback circuit is sometimes referred to hereinafter as the main or reference feedback circuit.

In this invention the phases of the two feedback voltages are very different, the amplitude-modulated feedback voltage normally being substantially 90° out of phase with the signal fed back through the main feedback circuit. These two voltages are added together vectorially and the resultant voltage is applied to the input of the amplifier in order to produce the desired frequency modulation of the output of the amplifier. Besides being applied to the two feedback circuits, the output of the frequency-modulated oscillator is applied to a utilization unit, for example, a recorder in which the frequency-modulated output signal is recorded on magnetic tape as a function of time, thereby producing a record which may subsequently be reproduced and analyzed, or utilized in some other way.

One object of this invention is to provide an improved frequency-modulated oscillator in which the amplitude of the signal appearing in the output is very nearly constant.

Another object of this invention is to provide an improved frequency-modulated oscillator of the type described, in which signals at modulating frequency are substantially eliminated from the modulating feedback circuit so that signals at modulating frequency are substantially prevented from amplitude-modulating the output signal of the oscillator.

Another object of this invention is to provide an improved frequency-modulated oscillator of the type described which has amplitude stability over a wide range of ambient temperatures.

The foregoing and other objects of the invention, together with various advantages thereof, will be readily apparent from the description of an embodiment of the invention, together with the accompanying drawings which illustrate various embodiments of the invention.

Figure 1:
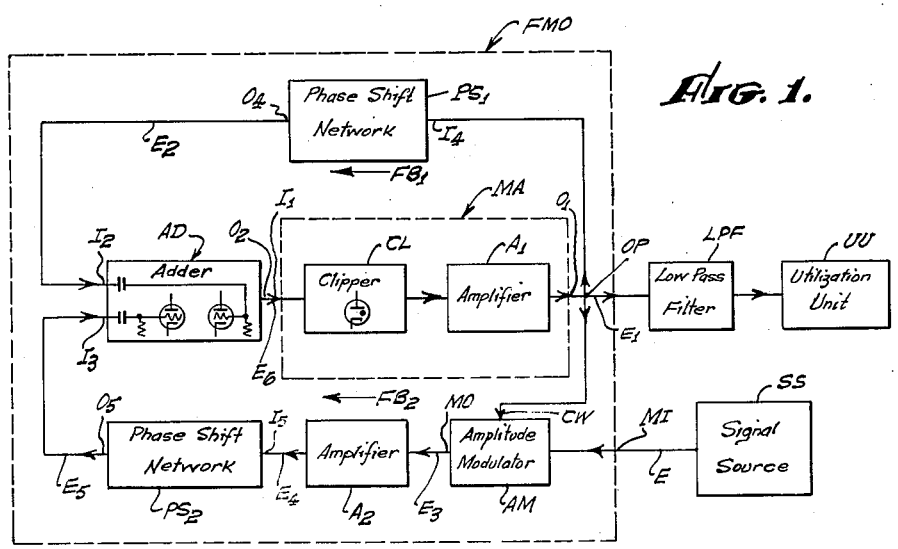
FIG. 1 is a schematic block diagram of a frequency-modulated oscillator embodying the invention.

Referring to the drawings, and more particularly to FIG. 1, there is shown a frequency-modulated oscillator FMO having an input MI to which signal voltages from a signal source SS are applied and having an output OP at which the frequency-modulated signals appear and from which they are transmitted through a low-pass filter LPF to a utilization unit UU.

In accordance with this invention, an output signal is produced which is of very nearly constant amplitude and which is frequency modulated in accordance with the amplitude of the signal applied by the signal source SS. In the best embodiment of the invention, the output is free of amplitude-modulation components and is also free of other objectionable variations of amplitude under a wide variety of ambient temperatures.

As illustrated in FIG. 1, the frequency-modulated oscillator FMO comprises a main amplifier channel MA which includes a clipper CL and a main amplifier $A_1$, connected in the order named, between an input $I_1$ and an output $O_1$. The signal appearing in the output $O_1$ of the amplifier channel MA is fed back to the input $I_1$ of the amplifier channel MA by means of two feedback circuits, a main feedback circuit $FB_1$ and an auxiliary feedback circuit $FB_2$. The signals fed back are applied to two inputs $I_2$ and $I_3$ of an adder AD where they are combined vectorially and the combined or resultant signal is applied to the input $I_1$ and is fed through the amplitude clipper CL to the main amplifier $A_1$.

For convenience of explanation, an oscillator is first considered in which no phase change occurs either in the clipper CL or in the main amplifier $A_1$ at the frequency of oscillation. In such a system, oscillation occurs when the resultant voltage produced at the output $O_2$ at the adder AD is in phase with the voltage appearing at the output $O_1$ of the amplifier $A_1$. The manner in which such a phase relationship is maintained while the output signal is being frequency modulated is explained hereinafter.

A first, or main, phase-shifting network $PS_1$ is included in the first feedback circuit $FB_1$ between the amplifier channel output $O_1$ and the input $I_2$ of the adder AD. A second, or auxiliary, phase-shifting network $PS_2$ is included in the second feedback circuit $FB_2$ between the main amplifier output $O_1$ and the input $I_3$ of the adder AD. The frequency-modulated signal $E_1$ appearing at the output $O_1$ of the main amplifier channel MA is applied directly to the input $I_4$ of the first phase-shifting network $PS_1$, the output signal $E_2$ of which is applied directly to the input $I_2$ of the adder AD. An amplitude modulator AM and an auxiliary feedback amplifier $A_2$ is provided in the second feedback circuit $FB_2$. The carrier-wave input CW of the modulator is connected to the output $O_1$ of the main amplifier channel MA and the output MO of the amplitude modulator AM is connected through the feedback amplifier $A_2$ to the input $I_5$ of the second phase-shifting network $PS_2$. The output signal $E_5$ appearing at the output $O_5$ of the phase-shifting network $PS_2$ is applied to a second input $I_3$ of the adder. As mentioned above, the adder AD adds the two voltages $E_2$ and $E_5$ vectorially and applies the vector sum to the input of the main amplifier $A_1$.

For convenience of explanation, consider a system in which the signal $E_4$ impressed upon the input $I_5$ of the second phase-shifting network $PS_2$ is of a phase opposite to that of the signal $E_1$ applied to the carrier-wave input CW of the amplitude modulator AM, when the signal E applied to the input MI of the amplitude modulator from the signal source SS is of positive polarity and is of the opposite phase when the input signal is of negative polarity. More particularly, consider such a system in which no phase change occurs when the amplitude-modulated signal is transmitted through the feedback amplifier $A_2$ and in which the phase of the signal $E_3$ appearing at the output MO of the amplitude modulator is opposite to that of the signal $E_1$ applied to the carrier-wave input CW when a positive signal voltage E is applied to the modulating input MI, and in which the phase of the signal $E_3$ appearing at the output MO is the same as the phase of the signal $E_1$ applied at the carrier-wave input CW when a negative signal voltage E is applied to its modulating input MI.

The phase-shifting network $PS_1$ is of a type in which the phase of the signal $E_2$ appearing in the output $O_4$ is nearly the same as the amplitude of the signal applied to the input $I_4$ but in which the phase between these two signals varies as a function of frequency. The phase-shifting network $PS_2$ is of a type in which the signal $E_5$ appearing at the output $O_5$ lags the signal applied to its input $I_5$ by approximately 90°. Thus the amplitude-modulated signal $E_5$ lags or leads the other feedback signal $E_2$ by 90°, depending on whether the amplitude of the modulating signal is positive or negative.

With such as arrangement, as more fully explained hereinbelow, the frequency of the signal appearing in the output $O_1$ of the main amplifier deviates from a standard or reference frequency $f_r$ of the oscillator by an amount that varies with the amplitude of the signal applied from the signal source SS to the input MI of the amplitude modulator AM.

Figure 2:
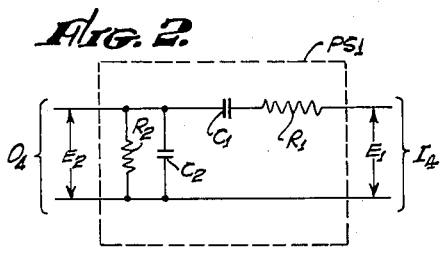
FIGS. 2 and 4 are wiring diagrams of the main and auxiliary phase-shift networks, respectively.

A simple form of the main phase-shifting network $PS_1$ that may be employed in practicing this invention is illustrated in FIG. 2. This phase-shifting network includes a resistor $R_1$ and a capacitor $C_1$ connected in series between the input $I_4$ and the output $O_4$ and a resistor $R_2$ and a capacitor $C_2$ connected in parallel across the output $O_4$. No phase shift occurs in this circuit at the frequency $f_r$ for which $$2\pi f_r R_1 C_1 = \frac{1}{2\pi f_r R_2 C_2}$$

The reference frequency $f_r$ of the oscillator is the frequency of the signal $E_1$ appearing at the output of the oscillator when no signal is applied to the amplitude modulator AM from the signal source SS. If, however, the frequency $f$ of the signal $E_1$ deviates from the reference frequency $f_r$, a phase shift does occur as the signal is transmitted through the first phase-shifting network $PS_1$. The amplitude of the signal $E_2$ appearing at the output $O_4$ of the main phase-shifting network $PS_1$ also varies somewhat with the frequency even though the amplitude of the signal applied to its input $I_4$ is constant.

Phase-shifting networks of the type illustrated in FIG. 2 are employed as part of a Wien-bridge in one well-known type of resistance-capacitance oscillator such as that described, for example, in "Electron-Tube Circuits" by Seely at page 259 ff (McGraw-Hill 1950). The oscillator FMO operates somewhat like the Wien-bridge oscillator described by Seely when the output of the amplitude modulator AM is zero, so that only the first feedback circuit $FB_1$ is active.

Figure 3:
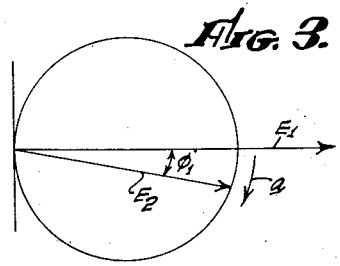
FIGS. 3 and 5 are polar diagrams of the transmission characteristics of the main and auxiliary phase-shift networks, respectively.

In FIG. 3 there is shown a polar diagram indicating how the amplitude and the phase of a signal are modified in its passage through the first phase-shifting network. Thus, in this graph, $E_1$ represents the voltage of the signal appearing at the output $O_1$ of the main amplifier $A_1$, and $E_2$ represents a voltage appearing at the output $O_4$ of the first phase-shifting network $PS_1$. As the frequency $f$ increases above the reference frequency $f_r$, the output voltage $E_2$ decreases slightly and the output $E_2$ lags the input voltage $E_1$. On the other hand, as the frequency $f$ decreases below the reference frequency $f_r$, the output voltage $E_2$ also decreases but the output voltage $E_2$ leads the input voltage $E_1$. In either event the lead or lag, as the case may be, increases in magnitude monotonically as a function of the magnitude of the frequency deviation $$\Delta f = f - f_r$$

Figure 4:
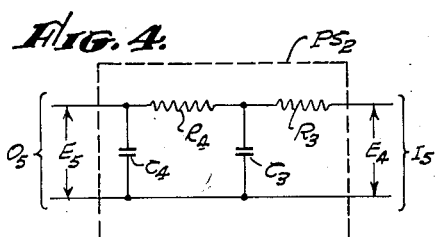

A network that may be employed as the second phase-shifting network $PS_2$ is illustrated in FIG. 4. This phase-shifting network includes two resistors $R_3$ and $R_4$ connected in series between the input $I_5$ and the output $O_5$, and two shunt capacitors $C_3$ and $C_4$ which are connected, respectively, on the output sides of the two resistors $R_3$ and $R_4$, one end of the capacitor $C_3$ being connected to the junction between the two resistors $R_3$ and $R_4$.

Figure 5:
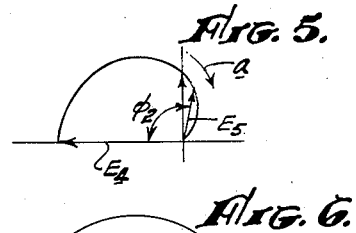

A polar diagram showing the relationship between the voltage $E_5$ appearing at the output $O_5$ compared to the voltage $E_4$ impressed upon the input of the auxiliary phase-shifting network $PS_2$ is shown in FIG. 5. In this diagram it is assumed that the voltage $E_4$ applied to the input of the second phase-shifting network $PS_2$ is opposite in phase to the voltage $E_1$ applied to the input $I_4$ of the first phase-shifting network $PS_1$. This relationship exists in this embodiment of the invention when the applied modulating signal E is positive. With this network $PS_2$, as the frequency increases, the magnitude of the voltage $E_5$ is gradually reduced and the phase lead $\phi_2$ of the voltage $E_5$ ahead of the input voltage $E_4$ is increased. In FIG. 5 it is assumed that $E_4$ is constant. While this is not true when the oscillator FMO is oscillating, nevertheless the graph of FIG. 5 shows how the amplitude of $E_5$ varies in comparison with the amplitude of $E_4$.

The constants of the circuit elements $R_3$, $R_4$, $C_3$ and $C_4$ of the second phase-shifting network $PS_2$ are so chosen that the voltage $E_5$ lags or leads the input voltage $E_4$ by approximately 90° at all frequencies in the range of operation of the oscillator FMO. Thus, the voltage $E_5$ at the output of the second phase-shifting network $PS_2$ lags the voltage $E_2$ at the output of the first phase-shifting network $PS_1$ when the modulating signal voltage is positive and leads the voltage $E_2$ when the modulating signal is negative. With this arrangement the output frequency $f$ increases when the amplitude of the modulation frequency increases and decreases when the amplitude of the modulation frequency decreases, thus establishing a very natural relationship between frequency and amplitude.

In any event, as mentioned previously, the two output voltages $E_2$ and $E_5$ supplied from the phase-shifting networks $PS_1$ and $PS_2$ are impressed upon the adder AD where they are added vectorially and the vector sum $E_6$ appearing at the output of the adder AD is impressed upon the clipper CL and the clipped signal is applied to the input of the main amplifier $A_1$.

Figure 6:
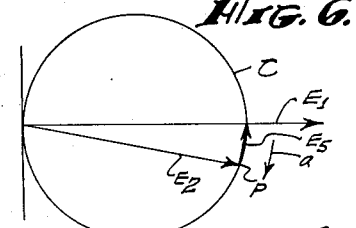
FIG. 6 is a vector diagram of the output of the adder.

In FIG. 6 there is illustrated a vector diagram showing the relationship of the four voltages $E_1$, $E_2$, $E_5$ and $E_6$ when the modulating signal voltage is positive. As previously explained, the resultant of the voltages $E_2$ and $E_5$, must be in phase with the voltage $E_1$ when oscillation is occurring at any frequency. At all frequencies, the two voltages $E_2$ and $E_5$ are substantially in quadrature, namely, about 90° out of phase. For this reason, as the magnitude of the signal $E_5$ varies in response to variations in the control signal E, the frequency of oscillation also varies. This fact is indicated by movement of the point P, which represents the terminal of the voltage vector $E_2$ along the periphery of the circle C in FIG. 6. In practice the frequency of oscillation $f$ deviates from the reference frequency $f_r$ by an amount which is approximately proportional to the magnitude of the voltage $E_4$.

The arrow $a$ in FIGS. 3, 5, and 6 indicates the direction of increasing frequency.

As mentioned previously, the signal supplied by the signal source SS to the amplitude modulator AM causes the signal appearing at the output of the amplitude modulator to vary substantially in proportion to the amplitude of the modulating signal. When the amplitude of the modulating voltage E is positive, the voltage $E_2$ leads the voltage $E_5$ and the frequency deviation $\Delta f$ is positive, but when the amplitude of the modulating voltage E is negative, the frequency deviation $\Delta f$ is negative and the voltage $E_2$ lags the voltage $E_5$. Various forms of amplitude modulator AM that may be employed in accordance with my invention and special advantages that are characteristic of the different modulators are described hereinbelow.

Figure 8:
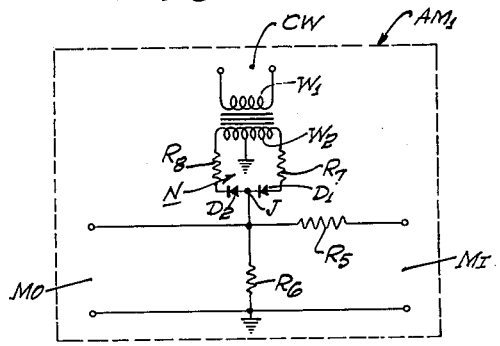
FIG. 8 is a wiring diagram of an amplitude modulator employed in an auxiliary feedback network.

The amplitude modulator AM1 of FIG. 8 is particularly useful when the signal source SS has a low impedance. This amplitude modulator AM1 employs a potential divider in the form of two resistors $R_5$ and $R_6$ connected in series across the input MI. The output MO is connected across the smaller of the resistors $R_6$. The output signal from the oscillator FMO is applied to the carrier-wave input CW which is formed across the primary winding $W_1$ of a transformer F which has a secondary winding $W_2$, the center turn T of which is grounded. Two resistors $R_7$ and $R_8$ are connected in series with a pair of diodes $D_1$ and $D_2$ across the secondary winding $W_2$. The secondary winding $W_2$, the resistors $R_7$ and $R_8$ and the diodes $D_1$ and $D_2$ form a symmetrical balanced network, or bridge, N with respect to a junction J between the two resistors $R_5$ and $R_6$. The balanced network N forms, in effect, a variable resistance which shunts the resistor $R_6$ across the modulator output MO.

In practice the voltage appearing across the transformer winding $W_2$ exceeds any voltage that may be impressed upon the modulator input MI. When the voltage across the secondary winding $W_2$ is of one polarity, a large current flows in the "forward" direction through the two diodes $D_1$ and $D_2$ and their resistances are low, thus providing a nearly zero resistance or a short circuit shunting the resistor $R_6$. But when the voltage appearing across the secondary winding $W_2$ is of the opposite polarity, substantially no current flows in the "backward" direction through the two diodes $D_1$ and $D_2$ and a very large resistance shunts the output resistor $R_6$.

In effect, the network N provides switching means which periodically shorts the output MO, thus in effect alternately disconnecting and connecting the output MO to the input MI. Even though the signal $E_1$ supplied by the oscillator is sinusoidal, a substantially square wave appears across the output OP. This square wave has the same fundamental frequency as the alternating current impressed upon the carrier input CW of the amplitude modulator but the amplitude of this substantially square wave is proportional to the voltage supplied to the input MI from the signal source SS. In the specific embodiment of the invention described above, the connection of the transformer F and the diodes $D_1$ and $D_2$ is such that the polarity of the signal $E_3$ appearing at the output is opposite to that of the alternating current signal $E_1$ applied to the carrier-wave input CW when the modulating signal applied to the modulating input MI is positive. In other words, under these conditions the component of the square wave that has the same frequency as the wave generated by the frequency-modulated oscillator FMO is 180° out of phase with the oscillator output signal $E_1$.

In practice the signal appearing at the output MO of the modulator is not a geometrically square wave but is more or less flattened when the amplitude of the output is a maximum deviating from a square wave shape because of the fact that the resistances of the diodes $D_1$ and $D_2$ vary somewhat with the magnitude of the current flowing through them. Nevertheless it is convenient to refer to it as a square wave.

Figure 9:
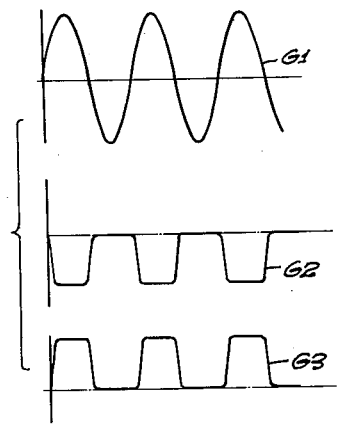
FIG. 9 is a graph employed in explaining the operation of the amplitude modulator.
Figure 11:
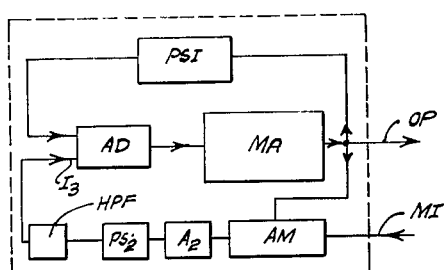
FIG. 11 is a block diagram of a form of oscillator which includes means for attenuating signals of modulating frequency in the auxiliary feedback network.
Figure 12:
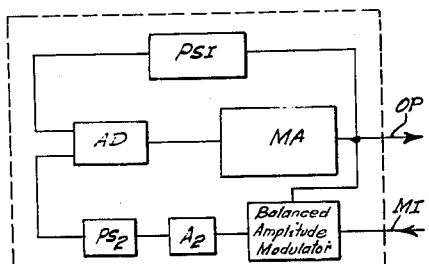
FIG. 12 is a block diagram of a form of oscillator employing a balanced amplitude modulator for preventing all signals of modulating frequency from being fed back through the auxiliary feedback circuit.

In FIG. 9 there are illustrated three time-coordinated graphs showing how the output of the amplitude modulator $AM_1$ varies according to whether a positive or a negative modulating voltage is applied to its input. In this figure graph G1 represents the alternating voltage supplied to the carrier-wave input CW from the output OP of the frequency-modulated oscillator. Graph G2 indicates how the output signal $E_3$ of the amplitude modulator varies when a positive control voltage is applied to the modulating input MI. And graph G3 indicates how the output signal $E_3$ varies when a negative control voltage is applied to the modulating input MI. As clearly indicated in FIG. 9, the output of the amplitude modulator AM is of opposite phase compared with the carrier-wave input when the impressed control voltage is positive but is in phase with the carrier-wave input when the signal applied to the input IP is negative.

The graphs shown in FIGS. 3, 5 and 6 apply to the component of the square wave output of the modulator AM which is of the same frequency as the signal $E_1$ appearing in the output of the frequency-modulated oscillator.

Figure 10:
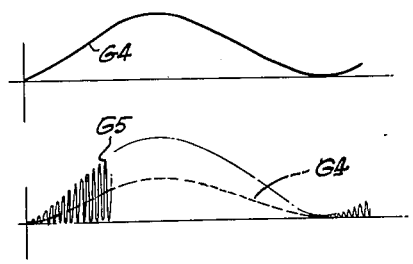
FIG. 10 is a series of graphs employed in explaining the operation of various forms of the oscillator.

The graphs of FIG. 10 illustrate what occurs when signal is applied to the input IP. In this figure graph G4 represents a variable but unidirectional modulating signal, while graph G5 represents the modulator output of the amplitude modulator AM1.

It will be noted that the output produced by the amplitude modulator AM1 of FIG. 8 is asymmetrical. In effect, it comprises a symmetrical amplitude-modulated carrier wave represented by graph G6 superimposed upon the modulating signal. Thus both of the signals represented by the graphs G4 and G6 are present in the signal represented by graph G5.

Figure 7:
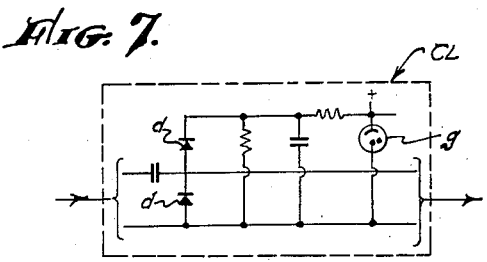
FIG. 7 is a wiring diagram of a clipper.

As explained above, the output of the amplitude modulator is applied ot the input $I_3$ of the adder, and the output of the adder is applied to the bilateral clipper CL. The clipper CL, illustrated in FIG. 7, includes a signal limiter $g$ in the form of an energized gaseous discharge lamp such as an 85A2 and a pair of diodes $d$ which are so connected and arranged to limit the peak values of the signal voltage during both the positive and the negative parts of the signal. It is often said that when a discharge tube is conducting, the voltage across it is constant. In practice, however, the voltage varies somewhat with the magnitude of voltage applied thereto. Accordingly, when a wave, such as that represented by graph G2 of FIG. 9, is applied to the clipper, some amplitude modulation occurs in addition to the frequency modulation that is otherwise produced. In this case, however, because of the quadrature relationship of the two signals $E_2$ and $E_5$ applied to the adder AD, the amplitude modulation of the resultant signal $E_6$ produced by the adder is much less than the amplitude modulation of the amplified signal $E_5$ produced by the amplitude modulator.

Much of the detrimental amplitude modulation otherwise produced can be eliminated by connecting a highpass filter between the phase-shifting network PS2 and the input $I_3$ of the adder AD as shown in FIG. 10. Such a filter has a cut-off above the frequencies of the modulating signals and below any frequency of oscillation of the frequency-modulated oscillator. If the filter produces substantially no phase shift in the pass band, the presence of the filter does not affect the action of the oscillator so far as phase shift action is concerned. If such phase shift does not occur, it is taken into account in the specific design of other parts of the oscillator. Since low-pass filters having substantially zero phase shift are well known and since the methods of such design are well known, they will not be described here in detail.

Figure 13:
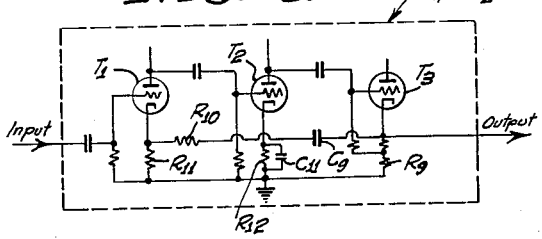
FIG. 13 is a wiring diagram of a negative feedback amplifier employed in the main amplifier channel and in the auxiliary feedback loop.

In order to attain a very high degree of stability of the frequency-modulated oscillator FMO, both the main amplifier $A_1$ and the feedback amplifier $A_2$ are themselves stabilized by means of negative feed back. Both of these amplifiers $A_1$ and $A_2$ are very stable in the range of frequencies in the neighborhood of the carrier, or reference, frequency $f_r$. The effective gain of the main amplifier $A_1$ is $1/\beta_1$ and the effective gain of the feedback amplifier $A_2$ is $1/\beta_2$ where $\beta_1$ and $\beta_2$ are the feedback ratios employed in the amplifiers $A_1$ and $A_2$ respectively. In FIG. 13 there is shown a schematic diagram of a typical amplifier $A_1$ or $A_2$. In the example, each amplifier, $A_1$ and $A_2$, comprises three stages, including amplifier tubes $T_1$, $T_2$, and $T_3$ connected in amplifying relation in the sequence named. The output of the amplifier $A_1$ or $A_2$ which appears across a cathode-loading resistor $R_9$ is fed back through a capacitor $C_9$ and a feedback resistor $R_{10}$ to the cathode resistor $R_{11}$ at the input. In each of the amplifiers $A_1$ and $A_2$ a by-pass capacitor $C_{12}$ is employed across the cathode resistor $R_{12}$ of the second stage amplifier tube $T_2$.

Figure 14:
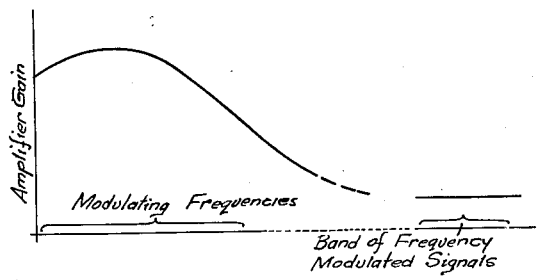
FIG. 14 is a graph showing how the amplification of such a negative feedback amplifier varies with frequency.

A graph showing in a rough manner how the amplifier gain varies with frequency in such a negative feedback amplifier $A_1$ or $A_2$ is illustrated in FIG. 14. As is well known, the feedback ratio $\beta_1$ or $\beta_2$ of such an amplifier is lower at low frequencies than at high frequencies. Because of this fact, both of the amplifiers $A_1$ and $A_2$ have higher gain at modulating frequencies than in the neighborhood of the reference, or carrier, frequency $f_r$. For this reason, as shown on FIG. 14, some modulating-frequency components which are produced at the output MO of the amplitude modulator are more highly amplified by the feedback amplifier $A_2$ than are the signals in the band of oscillation frequencies. Furthermore, any such modulating-frequency components of signal appearing at the output of the clipper CL are more highly amplified by the main amplifier $A_1$ than is the frequency-modulated component of the signal.

Each of the amplifiers $A_1$ and $A_2$ not only has a higher gain at low modulating frequencies than at high frequencies but may even cause the frequency-modulated oscillator to be regenerative at low frequencies. For this reason and also in order to minimize amplitude modulation of the frequency-modulated signal appearing at the output of the oscillator FMO, it is very desirable to eliminate substantially completely the modulation-frequency component of the signal appearing at the output MO of the amplitude modulator AM. A number of amplitude modulators capable of achieving this end are illustrated in FIGS. 15, 16, 17, and 18.

Figure 15:
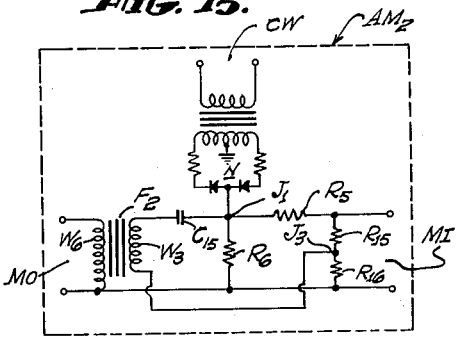
FIGS. 15, 16, 17, and 18 are wiring diagrams of various forms of balanced amplitude modulators employed in this invention.

In FIG. 15 there is illustrated an amplitude modulator AM2 that produces at its output a symmetrical amplitude-modulated wave, that is, an amplitude-modulated wave free of any modulating-frequency component. Such a symmetrical output is represented by graph G6 of FIG. 10. The amplitude modulator AM2 of FIG. 15 is similar to the amplitude modulator AM1 of FIG. 7 except for the differences specifically pointed out hereinafter. In the amplitude modulator AM2 a potential divider comprising two resistors $R_{15}$ and $R_{16}$ are connected in series across the input IP and a transformer $F_2$ is connected in the output. More particularly, the primary winding $W_3$ of the transformer is connected in series with a coupling capacitor $C_{15}$ between the junction $J_1$ between resistors $R_5$ and $R_6$ and the junction $J_3$ between the resistors $R_{15}$ and $R_{16}$. The secondary winding $W_4$ of the transformer $F_2$ is connected directly across the output MO. By balancing the values of the various resistors $R_5$, $R_6$, $R_{15}$, and $R_{16}$, approximately in accordance with the equation $$\frac{R_5}{R_6} = \frac{R_{15}}{R_{16}}$$

the modulating-frequency component that might otherwise appear in the output is substantially eliminated over a wide range of modulating-signal frequencies. In other words, the resistors $R_5$, $R_6$, $R_{15}$, and $R_{16}$ form a balanced bridge when the effective resistance of the network N is at its high value. The foregoing equation assumes that the high value of resistance of the network N is very large compared with the resistance of the circuit that it controls. Even if this condition does not exist, the bridge formed by the resistors $R_5$, $R_6$, $R_{15}$, and $R_{16}$ may still be balanced by adjusting the value of at least one of these resistors. Thus, the amplitude modulator AM2 of FIG. 15 is a balanced modulator.

By virtue of the fact that the modulating-frequency components are eliminated from the output of the balanced amplitude modulator AM2, such components do not disturb either of the amplifiers $A_1$ or $A_2$ and, hence, do not produce amplitude modulation of the output signal $E_1$ of the oscillator FMO. Any residual amplitude modulation still present is due entirely to the amplitude modulation of the symmetrical amplitude-modulated wave supplied to the input $I_3$ of the adder. However, amplitude modulation of the oscillator FMO from this cause is very small compared to amplitude modulation that would be produced if the modulating-signal components were not eliminated by the balanced modulator. This circuit also acts as a balanced modulator.

Figure 16:
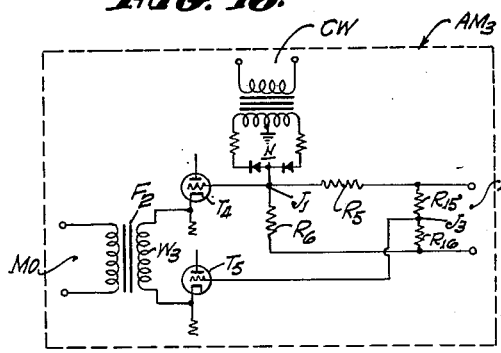

In FIG. 16 there is illustrated another form of amplitude modulator AM3. This amplitude modulator AM3 is substantially identical with the amplitude modulator AM2, except, however, that the coupling capacitor $C_{15}$ is eliminated and the opposite terminals of the primary winding $W_3$ are connected to the junctions $J_1$ and $J_3$ by means of cathode-follower units including amplifier tubes $T_4$ and $T_5$. This amplitude modulator has the advantage that the transformer $F_2$ is isolated from the remainder of the modulator so that the impedance of the transformer $F_2$ does not interact with the other elements of the circuit.

Figure 17:
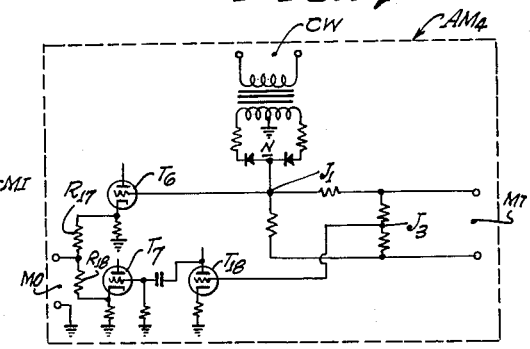

In FIG. 17 there is illustrated still another form of balanced amplitude modulator AM4. This amplitude modulator AM4 is similar to the amplitude modulator AM3 of FIG. 13. In this case, however, a transformerless output circuit is used. In the amplitude modulator AM4, one terminal of the output MO is connected to the junction between a pair of equal resistors $R_{17}$ and $R_{18}$. The other end of resistor $R_{17}$ is connected to the output of a cathode follower including a triode $T_6$ that has an input connected to the junction $J_1$. The other end of resistor $R_{18}$ is connected to the output circuit of a cathode follower $T_7$ which is connected to the junction $J_3$ through a phase inverter including a triode $T_8$. This circuit also acts as a balanced modulator.

Figure 18:
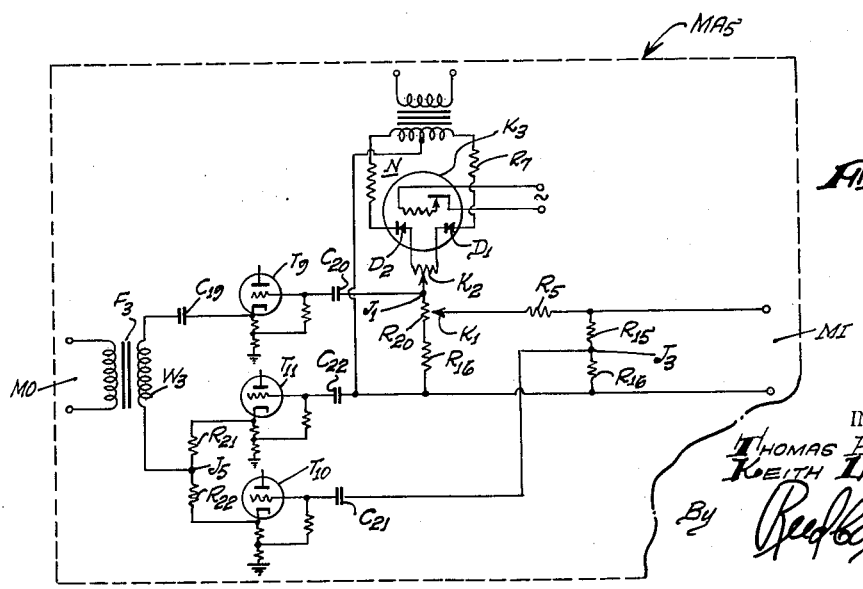

In FIG. 18 there is shown a balanced amplitude modulator AM5 which embodies a number of features which makes it adaptable for use under a wide variety of conditions. In this case the resistor $R_5$ is connected by a sliding contact $K_1$ to a rheostat $R_{20}$ at the end of resistor $R_{16}$ adjacent the junction $J_1$, and the junction $J_1$ is connected by a slider $K_2$ to a balancing rheostat $R_{20}$ that is inserted in the bridge network N between the two diodes $D_1$ and $D_2$. In this case the two diodes $D_1$ and $D_2$ are mounted in a thermostatically controlled case $K_3$ in order to maintain the temperatures of the two diodes $D_1$ and $D_2$ substantially constant even though the apparatus is exposed to different ambient temperatures. In this modulator the resistance characteristics of the two diodes are maintained substantially constant even though the ambient temperature changes.

In practice the moving contact $K_2$ is adjusted to balance the circuit so that no signal appears in the output MO when no signal is impressed on the input MI. Adjustment of the slider $K_2$ controls the width of the band of the frequency-modulated signals that are produced for a given maximum amplitude of the modulating signal.

In this case one terminal of the primary winding $W_3$ of the output transformer $F_3$ is connected through a coupling capacitor $C_{19}$ to the output circuit of a cathode follower tube $T_9$, the input of which is connected to the junction $J_1$ through a coupling capacitor $C_{20}$. The other terminal of the primary winding $W_3$ is connected to the junction $J_5$ between the two equal resistors $R_{21}$ and $R_{22}$ which are connected in the outputs of two cathode follower tubes $T_{10}$ and $T_{11}$, respectively. The input circuit of one of the cathode follower tubes $T_{10}$ is connected to the junction $J_3$ between the resistors $R_{15}$ and $R_{16}$ and the input of the other cathode follower tube $T_{11}$ is connected to the other end of the resistor $R_{16}$ through coupling capacitors $C_{21}$ and $C_{22}$, respectively.

With this arrangement all parts of the circuit, including the resistors $R_5$, $R_6$, $R_{15}$, and $R_{16}$, which are connected to the modulator input MI, are isolated from ground by means of the coupling capacitors $C_{20}$, $C_{21}$, and $C_{22}$. For this reason the signal source SS which is employed for supplying signals ot the input MI may float, that is, it may be maintained at a voltage different from ground, and may even be floating at a variable voltage with respect to ground, without interfering with the proper operation of the amplitude modulator AM5.

The embodiments of the invention described above are also of special utility where the signal supplied by the signal source is of alternating character, that is, where the signal has both positive and negative values. In some cases, however, signals of a single polarity are employed. This occurs, for example, where the signal source includes a pressure-responsive device which responds to atmospheric or hydrostatic pressure. In such a case the effective pressure value is usually positive. In many such cases, the signal supplied from the signal source is of a unidirectional character. For example, the voltages supplied from such a signal source to the input MI of the amplitude modulator may always be positive and never negative though they may reach a zero value.

It is often necessary to limit the band width of the signals produced by the frequency-modulated oscillator FMO for transmission by radio, as in a telemetering system. For example, the frequency may be restricted by government regulation to a band having a band-center frequency $f_c$ but having band limits of $\Delta F$. In such a case, when a unidirectional voltage produces the modulation, the constants of the circuit, such, for example, as the values of the resistors $R_5$ and $R_6$, FIG. 15, are so proportioned that when a signal equal to half the maximum signal expected is applied to the input MI of the amplitude modulator, the frequency of the output signal produced by the oscillator FMO will equal the center frequency $f_c$.

In the embodiments of the invention described above, the amplifiers $A_1$ and $A_2$, the high-pass filter HPF, the adder AD, and the clipper CL, introduce no phase shift at the frequencies of operation of the oscillator FMO. Such conditions are not essential to the invention. As a matter of fact, it will be readily understood by those skilled in the art that it is not necessary for the parts just mentioned to be free of phase shift, and that if they do prouce phase shift, the amount of phase shift that must be introduced by the phase-shift networks PS1 and PS2 may be altered accordingly to meet the requirements for oscillation. Furthermore, the invention has been described with reference to specific embodiments in which the two signals applied to the inputs $I_2$ and $I_3$ of the adder AD are very nearly in quadrature, that is, close to 90° out of phase. Such a system possesses maximum sensitivity. However, systems in which the two signals applied to the inputs of the adder are of a somewhat different phase, are also operative though somewhat less satisfactory.

While the invention has been described with reference to a number of specific embodiments thereof, it will be understood that it may be embodied in many other forms. It will, therefore, now be understood that many changes may be made without departing from the scope of the invention as defined by the following claims.

The invention claimed is:

1. An oscillator comprising:

a main negative feedback amplifier having an input and an output;
adding means for feeding the vector sum of two signals to the amplifier input;
first feedback means including a first phase-shift circuit for feeding an output signal from the amplifier output to said adding means with a phase that varies in accordance with the frequency of said output signal;
a source of control signal voltage having components of modulating frequency low compared with said output signal frequency;
modulating means controlled by the amplifier output signal and the control signal voltage for generating an amplitude-modulated signal having a carrier frequency equal to said output signal frequency and being amplitude modulated in accordance with the varying magnitude of said control signal voltage;
second feedback means including a second phase-shift circuit and an auxiliary negative feedback amplifier for applying said amplitude-modulated signal to said adding means with a phase that varies in accordance with said output signal frequency; and
signal clipping means connected between said adding means and said main negative feedback amplifier.

2. An oscillator comprising:

a main negative feedback amplifier having an input and an output;
adding means for feeding the sum of two signals to the amplifier input;
first feedback means including a first phase-shift circuit for feeding an output signal from the amplifier output to said adding means with a phase that varies in accordance with the frequency of said output signal;
a source of control signal voltage having components of modulating frequency low compared with said output signal frequency;
modulating means controlled by the amplifier output signal and the control signal voltage for generating an amplitude-modulated signal having a carrier frequency equal to said output signal frequency and being amplitude modulated in accordance with the varying magnitude of said control signal voltage;
second feedback means including a second phase-shift circuit and an auxiliary negative feedback amplifier for applying said amplitude-modulated signal to said adding means with a phase that varies in accordance with said output signal frequency;
signal clipping means connected between said adding means and said main negative feedback amplifier; and
means for preventing signals at said modulating frequency from being fed from said modulating means through said second feedback means to said adding means.

3. An oscillator comprising:

a main negative feedback amplifier having an input and an output;
adding means for feeding the sum of two signals to the amplifier input;
first feedback means including a first phase-shift circuit for feeding an output signal from the amplifier output to said adding means with a phase that varies in accordance with the frequency of said output signal;

a source of control signal voltage having components of modulating frequency low compared with said output signal frequency;

a balanced modulator controlled by the amplifier output signal and by said control signal voltage for generating an amplitude-modulated signal substantially free of modulating frequency components and having a carrier frequency equal to said output signal frequency and having an amplitude that is modulated in accordance with the varying magnitude of said control signal voltage;

second feedback means including a second phase-shift circuit and an auxiliary negative feedback amplifier for applying said amplitude-modulated signal to said adding means with a phase that varies in accordance with said output signal frequency; and signal clipping means connected between said adding means and said main negative feedback amplifier.

4. In an oscillator in which the output signal of an amplifier is fed back to the input of the amplifier through two paths having different phase shifts, the improvement comprising:

a source of control signal voltage having components of modulating frequency low compared with the frequency of said output signal;

an amplitude modulator connected in one of said paths, said modulator comprising a normally balanced circuit having a carrier wave input circuit supplied with signals from said amplifier output and having an output circuit connected to feed a signal through one of said paths to said amplifier input, said modulator also comprising circuit means for applying a control signal voltage from said signal source across the output of said normally balanced circuit to unbalance said balanced circuit in accordance with the magnitude of the control signal voltage, whereby the signal fed back through said one path is amplitude modulated in accordance with variations in said control signal voltage, said normally balanced circuit comprising a pair of unilaterally variable resistors that are temperature-sensitive; and thermostatically controlled means for maintaining the temperature of said resistors substantially constant whereby the degree of amplitude modulation of said feedback signal varies in accordance with the magnitude of said control signal voltage, but is independent of ambient temperature.

5. In an oscillator in which the output signal of an amplifier is fed back to the input of the amplifier through two paths having different phase shifts, the improvement comprising:

a source of control signal voltage having components of modulating frequency low compared with the frequency of said output signal; and an amplitude modulator connected in one of said paths, said modulator comprising a bridge circuit having a carrier wave input circuit supplied with signals from said amplifier output and having an output circuit connected to feed signals through one of said paths to said amplifier input, said bridge circuit comprising a pair of unilaterally variable resistors connected in adjacent arms thereof, said modulator also comprising circuit means for applying a control signal voltage from said signal source across the output of said bridge circuit to vary the resistances of said resistors in accordance with the magnitude of the control signal voltage, whereby an amplitude-modulated signal is fed back through said one path, the resistances of said resistors depending on their temperatures and on the voltages applied thereto, said bridge circuit comprising thermostatically-controlled means for maintaining the temperature of said resistors substantially constant, whereby the degree of amplitude modulation of said feedback signal varies in accordance with the magnitude of said control signal voltage, but is independent of ambient temperature.

6. In a frequency-modulated oscillator in which the output signal of an amplifier is fed back to the input of the amplifier through two paths having different phase shifts, the improvement comprising:

a source of control signal voltage having components of modulating frequency low compared with the frequency of said output signal; and an amplitude modulator connected in one of said paths, said modulator comprising:

a transformer having a primary winding and a secondary winding, said primary winding being supplied with signals from said amplifier output, a pair of unilaterally variable resistors connected in series across said secondary winding, the center of said secondary winding and the junction between said two resistors forming a bridge output, means for applying a control signal voltage from said signal source across said bridge output whereby the resistances of said resistors vary as a function of the amplitude of said control signal voltage, thereby producing at said bridge output a bridge output signal that is amplitude-modulated in accordance with variations in amplitude of said control signal voltage, and means for feeding said amplitude-modulated signal back through one of said paths to the input of said amplifier whereby the frequency of said output signal varies as a function of the magnitude of said control signal voltage.

7. In a frequency-modulated oscillator in which the output signal of a first negative-feedback amplifier is fed back to the input of the first amplifier through two paths having different phase shifts, the improvement comprising:

a source of control signal voltage having components of modulating frequency low compared with the frequency of said output signal;

an amplitude modulator located in one of the said paths, said amplitude modulator having a carrier wave input connected to the output of said first amplifier and having a modulator input connected to said control signal source and having a modulator output, said modulator comprising means including unilaterally variable resistance means interconnecting said carrier wave input, said modulator input, and said modulator output for generating an amplitude-modulated signal at said modulator output;

means including a second negative-feedback amplifier connected to said modulator output for applying said amplitude-modulated signal through said one path to the input of said amplifier; and a voltage clipper arranged at the input of said first amplifier for limiting the amplitude of the signal applied thereto, to a predetermined value.

8. In a frequency-modulated oscillator in which the output signal of a first negative-feedback amplifier is fed back to the input of the first amplifier through two paths having different phase shifts, the improvement comprising: a source of control signal voltage having components of modulating frequency low compared with the frequency of said output signal; a balanced amplitude modulator located in one of the said paths, said amplitude modulator having a carrier wave input connected to the output of said first amplifier and having a modulator input connected to said control signal source and having a modulator output, said modulator comprising means including unilaterally variable resistance means interconnecting said carrier wave input, said modulator input, and said modulator output for generating an amplitude-modulated signal at said modulator output; means including a second negative-feedback amplifier connected to said modulator output for applying said amplitude-modulated signal through said one path to the input of said amplifier, each of said negative-feedback amplifiers having a gain which is relatively high in the range of frequencies of the modulating frequencies compared with the gain that these amplifiers have in the range of the frequency-modulated signals; said frequency-modulated oscillator including means for preventing signal components lying in the range of said modulating frequencies from being transmitted through said amplitude modulator to either of said amplifiers.

References Cited in the file of this patent

UNITED STATES PATENTS

| | | |
|---|---|---|
| 2,446,829 | Miller | Aug. 3, 1948 |
| 2,453,243 | Mason | Nov. 9, 1948 |
| 2,463,073 | Webb | Mar. 1, 1949 |
| 2,504,050 | Rodhe | Apr. 11, 1950 |
| 2,558,214 | Gardere | June 26, 1951 |
| 2,749,441 | Kelly | June 5, 1956 |
| 2,799,829 | Gordon et al. | July 16, 1957 |
| 2,814,020 | Bouman et al. | Nov. 19, 1957 |

FOREIGN PATENTS

| | | |
|---|---|---|
| 759,573 | Great Britain | Oct. 17, 1956 |
| 781,374 | Great Britain | Aug. 21, 1957 |